United States Patent [19]
Laycock et al.

[11] Patent Number: 4,985,142
[45] Date of Patent: Jan. 15, 1991

[54] QUICK RELEASE FILTER BY-PASS VALVE

[75] Inventors: John E. Laycock; Ray C. Ramirez, both of San Diego, Calif.

[73] Assignee: Sundstrand Corporation, Rockford, Ill.

[21] Appl. No.: 451,144

[22] Filed: Dec. 15, 1989

[51] Int. Cl.[5] .................................... B01D 35/147
[52] U.S. Cl. .................................... 210/130; 210/133; 210/232; 210/238; 210/437; 210/453
[58] Field of Search ............... 210/130, 133, 232, 238, 210/244, 437, 453, 478, 480

[56] References Cited

U.S. PATENT DOCUMENTS

| | | | |
|---|---|---|---|
| 2,076,936 | 4/1936 | Burckhalter | 210/133 |
| 2,212,647 | 8/1940 | Nugent | 210/131 |
| 2,343,636 | 3/1944 | Bentley | 210/140 |
| 2,870,914 | 1/1959 | Block | 210/453 |
| 2,991,885 | 7/1961 | Gutkowski | 210/133 |
| 3,508,657 | 4/1970 | Cooper | 210/90 |
| 3,539,009 | 11/1970 | Kudlaty | 210/90 |
| 3,653,512 | 4/1972 | Brown | 210/130 |
| 3,747,761 | 7/1973 | Heinrich, Jr. | 210/120 |
| 3,883,430 | 5/1975 | Codo | 210/132 |
| 4,133,763 | 1/1979 | Cooper | 210/232 |
| 4,279,746 | 7/1981 | Leutz | 210/130 |
| 4,316,801 | 2/1982 | Cooper | 210/90 |
| 4,322,290 | 3/1982 | Carl | 210/232 |
| 4,529,515 | 7/1985 | Selz | 210/234 |

FOREIGN PATENT DOCUMENTS 982524 6/1951 France .................. 210/238

Primary Examiner—W. Gary Jones
Assistant Examiner—Matthew O. Savage
Attorney, Agent, or Firm—Wood, Phillips, Mason, Recktenwald & VanSanten

[57] ABSTRACT

In order to facilitate release of a filter by-pass valve (10) for filter element replacement in relatively inaccessible locations, the valve (10) includes a housing (12) defining a filter chamber (14) having an inlet (16) communicating with the filter chamber (14) at one end (18) of the housing (12) and an outlet (20) communicating with the filter chamber (14) at the other end (22) of the housing (12). An integral filter-valve assembly (24) is removably positionable within the housing (12) between the inlet (16) and outlet (20). The filter-valve asssembly (24) supports a filter element (26) within the filter chamber (14) in a manner defining a primary flow path from the inlet (16), through the filter element (26), and to the outlet (20). The filter-valve assembly (24) also includes a by-pass valve (28) defining a secondary flow path from the inlet (16) to the outlet (20). A handle (30) integral with the filter-valve assembly (24) extends to a point externally of the housing (12) for removing the filter-valve assembly (24) from the filter chamber (14) to replace the filter element (26). The valve also includes a retention blade (32) retractably extendable into a groove (34) in the housing (12) which is push button operable for selectively retaining the filter-valve assembly (24) within the housing (12). With this arrangement, a mechanism (38, 40) may also be provided for mechanically ensuring retention blade extension into the groove (34) in the housing (12) while also rendering the push button (62) selectively inoperable from an externally accessible location.

20 Claims, 2 Drawing Sheets

QUICK RELEASE FILTER BY-PASS VALVE

FIELD OF THE INVENTION

The present invention relates generally to a by-pass valve arrangement and, more particularly, to a quick release filter by-pass valve.

BACKGROUND OF THE INVENTION

In certain applications such as the auxiliary power units used on aircraft, a gear box of the reduction drive type may be utilized. The reduction drive gear box typically requires oil for cooling and lubrication and a filter to maintain clean oil. In other words, the oil is typically passed through a replaceable filter element in a recirculation path of the cooling and lubrication system.

Normally, the oil will enter a filter chamber, pass through the filter element, and return to the gear box. To prevent a dirty oil filter element from "starving" the gear box of oil, a by-pass valve arrangement is provided. With such arrangements, the by-pass valve diverts oil around the dirty filter element back into the gear box.

In order to gain access to the filter element for replacement, it has usually been necessary to remove a retaining ring from a groove in the housing. Only then can the by-pass valve be removed so as to gain access to the filter element but, in many gear box applications, the retaining ring is located in a relatively inaccessible location. When this occurs, it is known to be very difficult to remove the retaining ring for replacement of the filter element during normal maintenance procedures.

In addition, a retaining ring is usually notched in the housing groove in a very secure manner. This means that it is not possible to remove the retaining ring and, thus, the by-pass valve and filter, without the use of tools. Of course, this only adds to the difficulty of performing normal maintenance procedure.

The present invention is directed to overcoming one or more of the foregoing problems and achieving one or more of the resulting objects.

SUMMARY OF THE INVENTION

It is a principal object of the present invention to provide a quick release filter by-pass valve that is effective for its intended purpose. It is a further object of the present invention to provide a by-pass valve which is easily removable during normal maintenance procedures even from relatively inaccessible locations. It is yet another object of the present invention to provide a quick release filter by-pass valve that may be removed without tools.

An exemplary embodiment of the present invention achieves the foregoing in a quick release filter by-pass valve comprising a housing defining a filter chamber having an inlet communicating with the filter chamber at one end of the housing and an outlet communicating with the filter chamber at the other end of the housing. An integral filter-valve assembly is removably positionable within the housing between the inlet and outlet. The filter-valve assembly includes means for supporting a filter element within the filter chamber in a manner defining a primary flow path from the inlet, through the filter element, and to the outlet. The filter-valve assembly also includes by-pass valve means defining a secondary flow path from the inlet, around the filter element, and to the outlet. A handle integral with the filter-valve assembly extends to a point externally of the housing for removing the filter-valve assembly from the filter chamber to replace the filter element. Additionally, the quick release filter by-pass valve includes means for retaining the filter-valve assembly within the housing in the form of a retention blade retractably extendable into a groove in the housing and push button means operably associated with the retention blade for retraction thereof upon depression of the push button means and extension thereof upon release of the push button means.

In the exemplary embodiment, the push button means is accessible at a point externally of the housing. The by-pass valve also includes externally accessible means for mechanically ensuring retention blade extension into the groove in the housing. Further, the mechanical means also renders the push button means selectively inoperable.

In a preferred embodiment, the filter element supporting means comprises a valve body having a port in communication with the outlet through a fluid passageway. The filter element is removably securable to the valve body about the port. With this arrangement, a fluid must pass through the filter element in the primary flow path before the fluid can reach the outlet.

Preferably, the by-pass valve means is integrally associated with the valve body so as to be in communication with the outlet through the fluid passageway. The by-pass valve means is thus advantageously positioned such that a fluid can pass around the filter element in the secondary flow path. In this manner, the by-pass valve is adapted to cause the fluid to pass through the filter until the filter is dirty after which the fluid passes around the filter.

In a highly preferred embodiment, the by-pass valve means includes an orifice in the valve body leading from the filter chamber to the fluid passageway in spaced relation to the filter element. The by-pass valve means then also includes a spring biased ball valve normally seated on the orifice to cause the fluid to follow the primary flow path. The ball valve is advantageously disposed between the orifice and the fluid passageway. The by-pass valve means further includes a valve seat in the valve body surrounding the orifice adjacent the fluid passageway. With this arrangement, the by-pass valve means preferably includes a spring normally biasing the ball valve against the valve seat to cause the fluid to follow the primary flow path.

In the highly preferred embodiment of the invention, the valve body includes a retention blade-retaining groove alignable with the groove in the housing. The push button means is operably associated with the retention blade for retraction thereof into the retention blade-retaining groove. The valve body includes an internal chamber wherein the push button means is operably associated with the retention blade. The push button means includes a push button extending from the internal chamber to a point externally of the housing. More specifically, the push button means extends through the handle to a point externally of the housing where it is accessible for one hand operation thereof.

Preferably, the mechanical means includes a safety pin adapted to be inserted into a hole in the handle externally of the housing. The safety pin is, however, only insertable into the hole when the retention blade extends into the groove in the housing. As a result, it is possible to ensure retention blade extension while at the same time rendering the push button means selectively inoperable.

Other objects, advantages and features of the present invention will become apparent from a consideration of the following specification taken in conjunction with the accompanying drawings.

DETAILED DESCRIPTION OF THE PREFERRED EMBODIMENT

Figure 1:
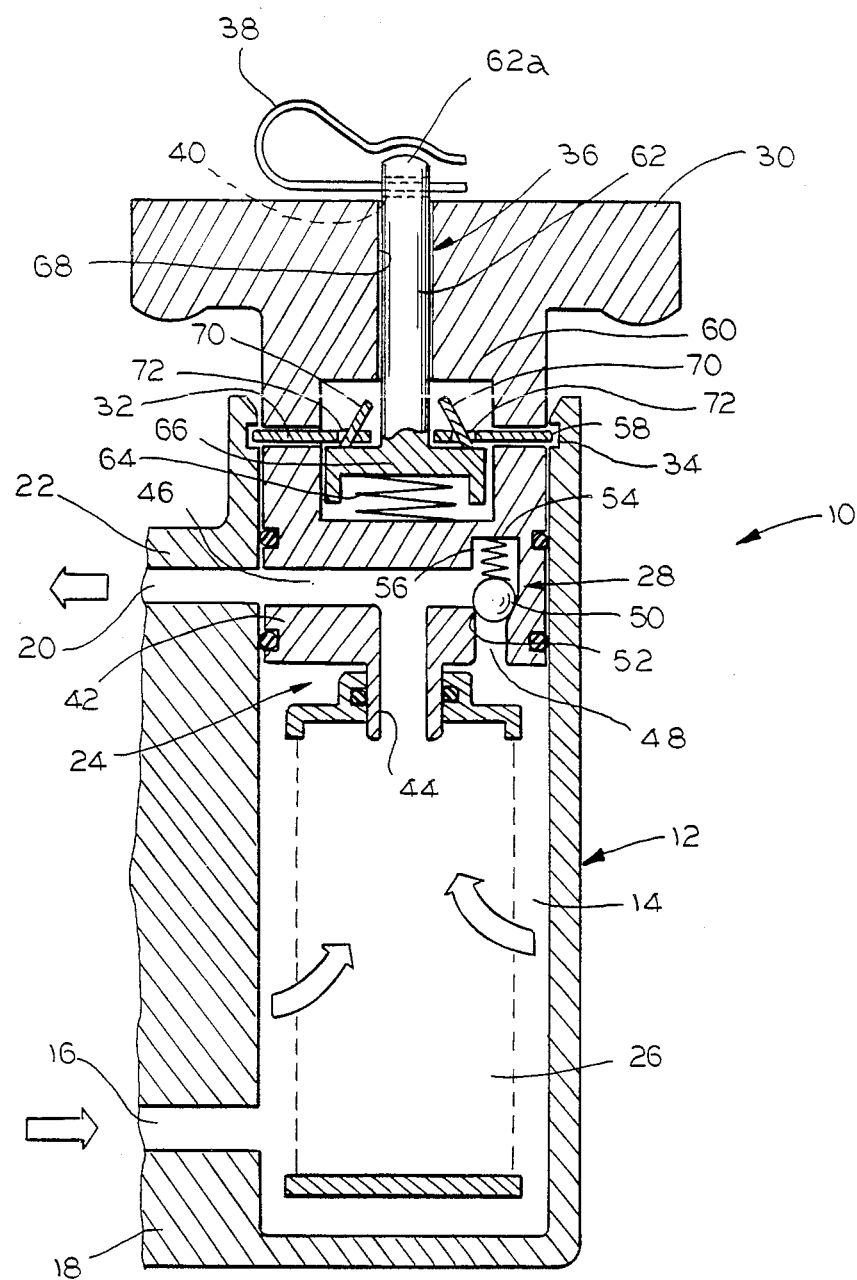
FIG. 1 is a cross sectional view of a quick release filter by-pass valve according to the invention in an "operable" position thereof.

Referring to the drawings, and first to FIG. 1, the reference numeral 10 designates generally a quick release filter by-pass valve in accordance with the present invention. The by-pass valve 10 includes a housing 12 defining a filter chamber 14 having an inlet 16 communicating with the filter chamber 14 at one end 18 of the housing 12 and an outlet 20 communicating with the filter chamber 14 at the other end 22 of the housing 12. An integral filter-valve assembly generally designated 24 is removably positionable within the housing 12 between the inlet 16 and outlet 20. The filter-valve assembly 24 includes means for supporting a filter element 26 within the filter chamber 14 in a manner defining a primary flow path from the inlet 16, through the filter element 26, and to the outlet 20. The filter-valve assembly 24 also includes by-pass valve means 28 defining a secondary flow path from the inlet 16, around the filter element 26, and to the outlet 20. A handle 30 integral with the filter-valve assembly 24 extends to a point externally of the housing 12 for removing the filter-valve assembly 24 from the filter chamber 14 to replace the filter element 26. The quick release filter by-pass valve 10 still further includes means for retaining the filter-valve assembly 24 within the housing 12 in the form of a retention blade 32 retractably extendable into a groove 34 in the housing 12 and push button means 36 operably associated with the retention blade 32 for retraction thereof. With this arrangement, the retention blade 32 can be retracted by depressing the push button means 36 and extended upon releasing the push button means 36 as will be described in greater detail hereinafter.

As will be appreciated from FIG. 1, the push button means 36 is readily accessible at a point externally of the housing 12. It will also be seen that the quick release filter by-pass valve 10 includes means for mechanically ensuring retention blade extension into the groove 34 in the housing 12 in the form of a safety pin 38 disposed within a hole 40 in the push button means 36. As will be appreciated, the safety pin 38 is externally accessible and cooperates with the hole 40 to render the push button means 36 selectively inoperable.

Still referring to FIG. 1, the filter element supporting means comprises valve body 42 which includes a port 44 in communication with the outlet 20 through a fluid passageway 46. The filter element 26 is removably securable to the valve body 42 about the port 44 such that a fluid must pass through the filter element 26 in the primary flow path. The by-pass valve means 28 is integrally associated with the valve body 42 in communication with the outlet 20 through the fluid passageway 46.

The by-pass valve means 28 is positioned in the valve body 42 such that a fluid can pass around the filter element 26 in the secondary flow path. For this purpose, the by-pass valve means 28 includes an orifice 48 in the valve body 42 leading from the filter chamber 14 to the fluid passageway 46 at a point in spaced relation to the filter element 26.

As will also be appreciated, the by-pass valve means 28 includes a spring biased ball valve 50 normally seated on the orifice 48 to cause the fluid to follow the primary flow path. The ball valve 50 is disposed between the orifice 48 and the fluid passageway 46, and the valve body 42 preferably includes a valve seat 52 surrounding the orifice 48 adjacent the fluid passageway 46. Further, the by-pass valve means 28 includes a spring 54 disposed within a recess 56 in the valve body 42 to normally bias the ball valve 50 against the valve seat 52.

As shown in FIG. 1, the valve body 42 includes a retention blade-retaining groove 58 alignable with the groove 34 in the housing 14, and the push button means 36 is operably associated with the retention blade 32 for retraction thereof into the retention blade-retaining groove 58. Thus, the retention blade 32 can be retracted into the retention blade-retaining groove 58 whenever it is desired to remove the filter-valve assembly 24 from the housing 12. In other words, the retention blade 32 normally cooperates with the groove 34 in the housing 12 to securely maintain the filter-valve assembly 24 within the housing 14 but is retractable into the retention blade-retaining groove 58 by depressing the push button means 36 to remove the filter-valve assembly 24 from the housing 12 (see FIG. 2).

Figure 2:
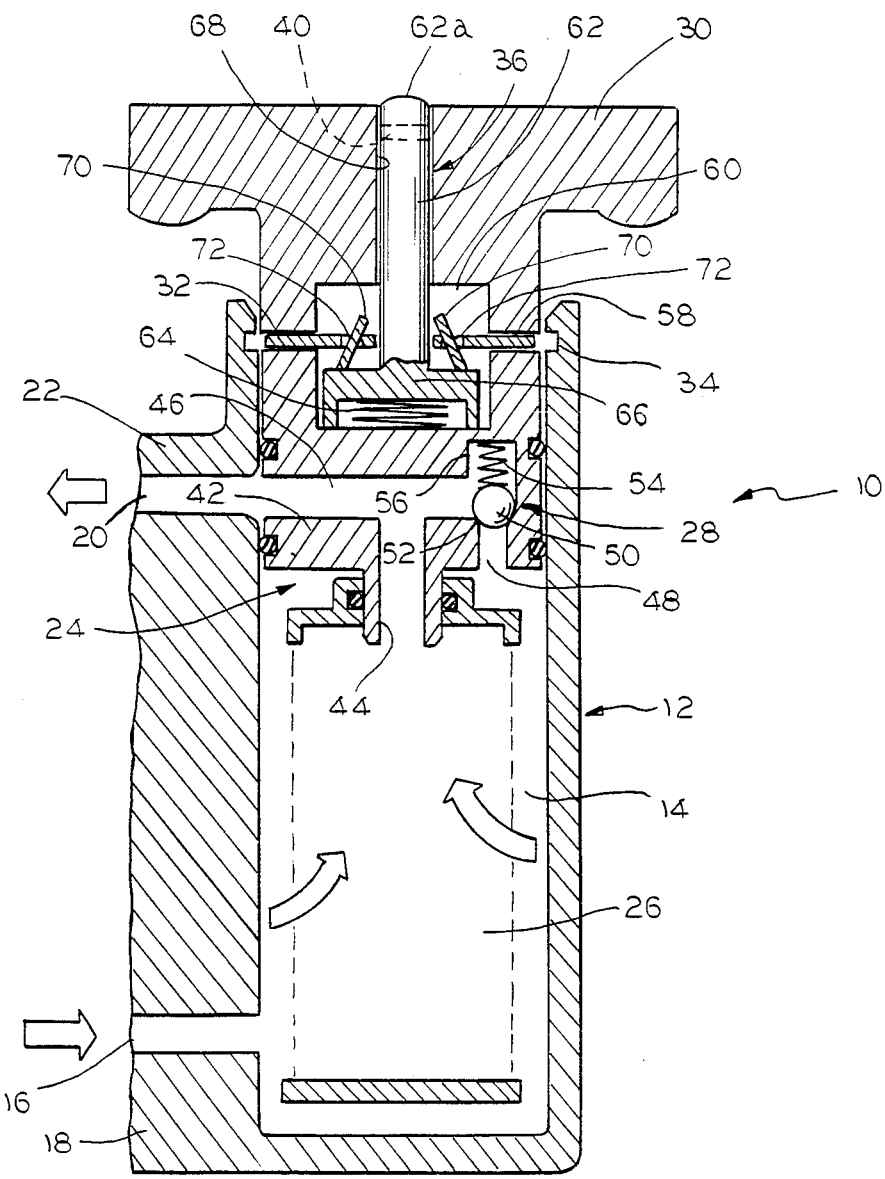
FIG. 2 is a cross sectional view of the quick release filter by-pass valve according to the invention in a "removal" position thereof.

Referring to FIGS. 1 and 2, the valve body 42 includes an internal chamber 60 wherein the push button means 36 is operably associated with the retention blade 32. The push button means 36 includes a push button 62 that is biased axially outwardly by means of a spring 64 so as to normally extend from the internal chamber 60 to a point externally of the housing 12 and so as to extend through the handle 30 where the end 62a of the push button 62 is readily accessible. As will be appreciated, the end 62a of the push button 62 cannot be depressed when the safety pin 38 is disposed in the hole 40 as illustrated in FIG. 1.

As will also be appreciated, the safety pin 38 cannot be inserted into the hole 40 in the push button 62 unless the retention blade 32 extends into the groove 34 in the housing 14. Thus, it can be assured that the filter-valve assembly 24 is properly positioned within the housing 12 after replacement of a filter element 26, i.e., the filter-valve assembly 24 is inserted into the housing 12 with the push button 62 depressed (see FIG. 2) and only when the retention blade 32 is aligned with the groove 34 can the push button 62 be released whereby the spring 64 will bias the push button 62 upwardly to a point where the hole 40 is above the handle 30 (see FIG. 1). As should now be appreciated, the safety pin 38 and hole 40 not only mechanically ensure retention blade extension into the groove 34 but also render the push button 62 selectively inoperable.

In this manner, it is possible to avoid inadvertent depression and removal of the filter-valve assembly 24.

At the same time, the quick release filter by-pass valve 10 solves the problem of relative inaccessibility since it requires maintenance personnel to only be able to have one handed access for removal of the valve without tools. In other words, maintenance personnel can very easily remove the safety pin 38 from the hole 40, depress the push button 62 against the biasing force of the spring 64, and remove the filter-valve assembly 24 for filter servicing.

Referring to FIGS. 1 and 2, the housing 12 is preferably generally cylindrical to define a generally cylindrical filter chamber 14. It is also advantageous for the inlet 16 and outlet 20 to be radially extending and for the filter-valve assembly 24 and filter element 26 to be generally cylindrical axially extending components. In addition, the by-pass valve means 28 is preferably an axially extending eccentrically positioned component.

More specifically, the by-pass valve means 28 is advantageously positioned at a radially offset position relative to the axis of the filter-valve assembly 24 and filter element 26.

As shown, the handle 30 and push button 62 preferably extend axially to points externally of the housing 12. It will also be appreciated that the retention blade 32 is preferably circumferentially extending so as to be retractably extendable into a circumferential groove 34 and selectively retractable into a circumferentially extending retention blade-retaining groove 58. In addition, the filter element supporting means preferably comprises a generally cylindrical valve body 42 having an axial port 44.

With this arrangement, the axial port 44 is advantageously in communication with the radial outlet 20 through a radial fluid passageway 46.

As previously suggested, the by-pass valve means 28 suitably includes an axially eccentric orifice 48, and it also suitably contemplates the ball valve 50, spring 54 and recess 56 likewise advantageously being axially eccentric. Finally, it will be appreciated that the safety pin 38 is preferably insertable into a diametrical hole 40 in the push button 62 extending generally parallel to a generally Tee shaped handle 30 when fully biased outwardly as shown in FIG. 1.

In the illustrated embodiment, the push button means 36 includes not only the push button 62 and spring 64 but also a spring receiving cap 66 of generally the same diameter as the internal chamber 60. Thus, the hole 68 through the handle 30 as well as the corresponding diameters of the internal chamber 60 and cap 66 serve as a guide for the push button 62 as it is depressed and released to retract and extend the retention blade 32. For the latter purpose, a pair of pins 70 extend through holes 72 at circumferentially spaced locations in the blade 32 to cause the retraction and extension thereof.

More specifically, the pins 70 are angled upwardly and toward the push button 62. Thus, as the push button 62 is depressed, the angle of the pins 70 causes the opposing ends of the generally circumferential blade 32 to be pulled inwardly, i.e., the retention blade 32 is removed from the groove 34 in the housing 14. When the push button 62 is released, the blade 32 is able to once again extend into the groove 34 in the housing 14.

While the pins 70 and holes 72 have proven entirely satisfactory, other means can also be employed. For instance, the inner workings may use cams, ramps, etc. to achieve the same or a like result. Still further, other details may be varied for other particular applications.

From the foregoing, it will be appreciated that a unique new quick release filter by-pass valve has been provided. It is particularly well suited for application to auxiliary power units used on aircraft and other applications utilizing a reduction drive gear box which may be of limited accessibility but requires oil for cooling and lubrication and a filter to maintain clean oil. With the present invention, it is possible to provide routine maintenance in a highly advantageous manner.

While in the foregoing there has been set forth a preferred embodiment of the invention, it will be appreciated that the details herein given may be varied by those skilled in the art without departing from the true spirit and scope of the appended claims.

I claim:

1. A quick release filter by-pass valve, comprising:
    a housing defining a filter chamber having an inlet communicating with said filter chamber at one end of said housing and an outlet communicating with said filter chamber at the other end of said housing;
    an integral filter-valve assembly removably positionable within said housing between said inlet and outlet, said filter-valve assembly including means for supporting a filter element within said filter chamber in a manner defining a primary flow path from said inlet, through said filter element, and to said outlet, said filter-valve assembly also including by-pass valve means defining a secondary flow path from said inlet to said outlet;
    a handle integral with said filter-valve assembly and extending to a point externally of said housing for removing said filter-valve assembly from said filter chamber to replace said filter element;
    means for retaining said filter-valve assembly within said housing, said retaining means including a retention blade retractably extendable into a groove in said housing and push button means operably associated with said retention blade for retraction thereof upon depression of said push button means and extension thereof upon release of said push button means, said push button means being accessible at a point externally of said housing; and
    means for mechanically ensuring retention blade extension into said groove in said housing, said mechanical means being externally accessible, said mechanical means rendering said push button means selectively inoperable.

2. The quick release filter by-pass valve of claim 1 wherein said filter element supporting means comprises a valve body, said valve body including a port in communication with said outlet through a fluid passageway, said filter element being removably securable to said valve body about said port such that a fluid must pass through said filter element in said primary flow path.

3. The quick release filter by-pass valve of claim 1 wherein said filter element supporting means comprises a valve body, said by-pass valve means being integrally associated with said valve body in communication with said outlet through a fluid passageway, said by-pass valve means being positioned such that a fluid can pass around said filter element in said secondary flow path.

4. The quick release filter by-pass valve of claim 3 wherein said by-pass valve means includes an orifice in said valve body, said orifice leading from said filter chamber to said fluid passageway in spaced relation to said filter element, said by-pass valve means also including a spring biased ball valve normally seated on said orifice to cause said fluid to follow said primary flow path.

5. The quick release filter by-pass valve of claim 4 wherein said ball valve is disposed between said orifice and said fluid passageway, said valve body having a a valve seat surrounding said orifice adjacent said fluid passageway, said by-pass valve means including a spring normally biasing said ball valve against said valve seat to cause said fluid to follow said primary flow path.

6. The quick release filter by-pass valve of claim 1 wherein said filter element supporting means comprises a valve body, said valve body including a retention blade-retaining groove alignable with said groove in said housing, said push button means being operably associated with said retention blade for retraction thereof into said retention blade-retaining groove.

7. The quick release filter by-pass valve of claim 1 wherein said filter element supporting means comprises a valve body, said valve body including an internal chamber wherein said push button means is operably associated with said retention blade, said push button means including a push button extending from said internal chamber to said point externally of said housing.

8. The quick release filter by-pass valve of claim 7 wherein said push button extends through said handle to said point externally of said housing, said mechanical means including a safety pin adapted to be inserted into a hole in said handle, said safety pin only being insertable into said hole when said retention blade extends into said groove in said housing.

9. A quick release filter by-pass valve, comprising:
a housing defining a filter chamber having an inlet communicating with said filter chamber at one end of said housing and an outlet communicating with said filter chamber at the other end of said housing;
an integral filter-valve assembly removably positionable within said housing between said inlet and outlet, said filter-valve assembly including means for supporting a filter element within said filter chamber in a manner defining a primary flow path from said inlet, through said filter element, and to said outlet, said filter-valve assembly also including by-pass valve means defining a secondary flow path from said inlet to said outlet;
a handle integral with said filter-valve assembly and extending to a point externally of said housing for removing said filter-valve assembly from said filter chamber to replace said filter element;
means for retaining said filter-valve assembly within said housing, said retaining means including a retention blade retractably extendable into a groove in said housing and push button means operably associated with said retention blade for retraction thereof upon depression of said push button means and extension thereof upon release of said push button means, said push button means being accessible at a point externally of said housing;
said filter element supporting means comprising a valve body having an internal chamber wherein said push button means is operably associated with said retention blade, said valve body also including a retention blade-retaining groove alignable with said groove in said housing and in communication with said internal chamber, said push button means being depressible externally of said housing for fully retracting said retention blade from said groove in said housing into said retention blade-retaining groove; and
means for mechanically ensuring retention blade extension into said groove in said housing, said mechanical means being externally accessible, said mechanical means rendering said push button means selectively inoperable.

10. The quick release filter by-pass valve of claim 9 wherein said valve body includes a port in communication with said outlet through a fluid passageway, said filter element being removably securable to said valve body about said port such that a fluid must pass through said filter element in said primary flow path.

11. The quick release filter by-pass valve of claim 9 wherein said by-pass valve means is in communication with said outlet through a fluid passageway in said valve body, said by-pass valve means being positioned such that a fluid can pass from said inlet around said filter element to said outlet in said secondary flow path.

12. The quick release filter by-pass valve of claim 11 by-pass valve means includes an orifice in said valve body leading from said filter chamber to said fluid passageway, said by-pass valve means also including a spring biased ball valve normally seated on said orifice to cause said fluid to follow said primary flow path.

13. The quick release filter by-pass valve of claim 12 wherein said ball valve is disposed between said orifice and said fluid passageway on a valve seat, said by-pass valve means including a spring normally biasing said ball valve against said valve seat to cause said fluid to follow said primary flow path.

14. The quick release filter by-pass valve of claim 9 wherein said push button means extends through said handle to said point externally of said housing, said mechanical means including a safety pin insertable into a hole in said handle only when said retention blade extends into said groove in said housing.

15. A quick release filter by-pass valve, comprising:
a generally cylindrical housing defining a generally cylindrical filter chamber having a radial inlet communicating with said filter chamber at one end of said housing and a radial outlet communicating with said filter chamber at the other end of said housing;
an integral axially extending generally cylindrical filter-valve assembly removably positionable within said housing between said inlet and outlet, said filter-valve assembly including means for supporting an axially extending generally cylindrical filter element within said filter chamber in a manner defining a primary flow path from said inlet, through said filter element, and to said outlet, said filter-valve assembly also including eccentrically positioned by-pass valve means defining a secondary flow path from said inlet to said outlet;
a handle integral with said filter-valve assembly and extending axially to a point externally of said housing for removing said filter-valve assembly from said filter chamber to replace said filter element;
means for retaining said filter-valve assembly within said housing, said retaining means including a pair of circumferentially extending retention blades retractably extendable into a circumferential groove in said housing and axially extending push button means operably associated with said retention blades for retraction thereof upon depression of said push button means and extension thereof upon release of said push button means, said push button means being axially accessible at a point externally of said housing;
said filter element supporting means comprising a generally cylindrical valve body having an internal chamber wherein said push button means is operably associated with said retention blades, said valve body also including a circumferentially extending retention blade-retaining groove alignable with said groove in said housing and in communication with said internal chamber, said push button means being axially depressible externally of said housing for fully retracting said retention blades from said groove in said housing into said retention blade-retaining groove; and means for mechanically ensuring retention blade extension into said groove in said housing, said mechanical means being externally accessible, said mechanical means rendering said push button means selectively inoperable.

16. The quick release filter by-pass valve of claim 15 wherein said valve body includes an axial port in communication with said outlet through a radial fluid passageway, said filter element being removably securable to said valve body about said port such that a fluid must pass through said filter element in said primary flow path.

17. The quick release filter by-pass valve of claim 15 wherein said by-pass valve means is in communication with said outlet through a radial fluid passageway in said valve body, said by-pass valve means being positioned such that a fluid can pass from said inlet around said filter element to said outlet in said secondary flow path.

18. The quick release filter by-pass valve of claim 17 wherein said by-pass valve means includes an axially extending orifice in said valve body leading from said filter chamber to said fluid passageway, said by-pass valve means also including a spring biased ball valve normally seated on said orifice to cause said fluid to follow said primary flow path.

19. The quick release filter by-pass valve of claim 18 wherein said ball valve is disposed between said orifice and said fluid passageway on a valve seat, said by-pass valve means including a spring normally biasing said ball valve against said valve seat to cause said fluid to follow said primary flow path.

20. The quick release filter by-pass valve of claim 15 wherein said push button means extends axially through said handle to said point externally of said housing, said mechanical means including a safety pin insertable into a diametrical hole in said handle only when said retention blades extend into said groove in said housing.

* * * * *